US011946303B2

(12) United States Patent
Duncan

(10) Patent No.: US 11,946,303 B2

(45) Date of Patent: Apr. 2, 2024

(54) FIXTURE FOR VENTING A ROOF

(71) Applicant: GDX, LLC, Ravensdale, WA (US)

(72) Inventor: Brian P. Duncan, Ravensdale, WA (US)

(73) Assignee: GDX, LLC, Ravensdale, WA (US)

( * ) Notice: Subject to any disclaimer, the term of this patent is extended or adjusted under 35 U.S.C. 154(b) by 353 days.

(21) Appl. No.: 17/433,278

(22) PCT Filed: Feb. 19, 2020

(86) PCT No.: PCT/US2020/018754

§ 371 (c)(1),
(2) Date: Aug. 24, 2021

(87) PCT Pub. No.: WO2020/176300

PCT Pub. Date: Sep. 3, 2020

(65) Prior Publication Data

US 2022/0145688 A1 May 12, 2022

Related U.S. Application Data

(60) Provisional application No. 62/948,571, filed on Dec. 16, 2019, provisional application No. 62/810,562, filed on Feb. 26, 2019.

(51) Int. Cl.
*E05F 1/12* (2006.01)
*E04D 13/03* (2006.01)
(Continued)

(52) U.S. Cl.
CPC ........ *E05F 1/1215* (2013.01); *E04D 13/0354* (2013.01); *E05F 1/006* (2013.01);
(Continued)

(58) Field of Classification Search
CPC .... E05F 1/1215; E05F 1/006; E04D 13/0354; F24F 11/34; F24F 7/02; E05B 47/0001;
(Continued)

(56) References Cited

U.S. PATENT DOCUMENTS 3,735,530 A 5/1973 Bogaert
5,123,875 A * 6/1992 Eubank .................. F24F 7/025 236/44 C (Continued)

FOREIGN PATENT DOCUMENTS

DE 2932865 A1 3/1981
DE 2932865 C2 * 3/1989

(Continued)

*Primary Examiner* — Theodore V Adamos

(74) *Attorney, Agent, or Firm* — Sisson & Banyas, Attorneys at Law, LLC; Jeffrey J. Banyas

(57) ABSTRACT

It is described herein a venting apparatus for an opening in a roof. The venting apparatus for an opening in a roof may comprise a structural frame, an adapter, a mount, a hinge, and a latch. The adapter may comprise a frame adapter section, a lip extending inwardly from a portion of the frame adapter section inner surface, and a protrusion extending upwardly from the lip. The frame adapter section may be configured to fit around an outer surface of the structural frame while the mount may be configured to fit around an outer surface of the protrusion. The latch may be configured to receive a signal from a device when the device detects the presence of smoke within the building to cause the latch to change from a latch closed position to a latch opened position.

20 Claims, 15 Drawing Sheets

(51) Int. Cl.

| | |
|---|---|
| ***E04D 13/035*** | (2006.01) |
| ***E05F 1/00*** | (2006.01) |
| ***F24F 7/02*** | (2006.01) |
| ***F24F 11/34*** | (2018.01) |

(52) U.S. Cl.
CPC ................ *F24F 7/02* (2013.01); *F24F 11/34* (2018.01); *E04D 13/0315* (2013.01); *E05Y 2201/454* (2013.01); *E05Y 2201/484* (2013.01); *E05Y 2800/252* (2013.01); *E05Y 2900/13* (2013.01)

(58) Field of Classification Search
CPC ....... E05B 2047/0067; E05Y 2201/454; E05Y 2201/484; E05Y 2900/13; E05Y 2800/252
See application file for complete search history.

(56) References Cited

U.S. PATENT DOCUMENTS

| | | | | |
|---|---|---|---|---|
| 5,855,510 | A * | 1/1999 | McKenzie | A62C 2/24 454/239 |
| 6,672,020 | B1 * | 1/2004 | Cermola | E04D 13/0315 52/200 |
| 2007/0241709 | A1 * | 10/2007 | Cardwell | F16P 3/147 318/484 |
| 2007/0271848 | A1 | 11/2007 | Wolf et al. | |
| 2019/0211561 | A1 * | 7/2019 | Dempster | E05F 1/1091 |
| 2019/0249889 | A1 * | 8/2019 | Chan | E04D 13/0325 |

FOREIGN PATENT DOCUMENTS

| | | | | |
|---|---|---|---|---|
| EP | 2003262 | A2 | 12/2008 | |
| EP | 2383401 | A2 | 11/2011 | |
| EP | 2423406 | A1 | 2/2012 | |
| EP | 2924209 | A1 | 9/2015 | |
| EP | 3239439 | A1 | 11/2017 | |
| FR | 2661703 | A1 * | 11/1991 | |
| FR | 2678308 | A1 * | 12/1992 | E04D 13/0354 |
| FR | 2678308 | A1 | 12/1992 | |
| GB | 2479883 | A * | 11/2011 | E05F 15/63 |
| WO | 2013/171771 | A1 | 11/2013 | |

* cited by examiner

FIXTURE FOR VENTING A ROOF

CROSS REFERENCES AND PRIORITIES

This Application claims priority from U.S. Provisional Application No. 62/810,562 filed on 26 Feb. 2019, U.S. Provisional Application No. 62/948,571 filed on 16 Dec. 2019, and International Application No. PCT/US2020/018754 filed on 19 Feb. 2020, the teachings of each of which are incorporated by reference herein in their entirety.

BACKGROUND

When a structure—such as a residential home—catches fire, injuries and deaths often occur. Such injuries or deaths are often caused, not by heat from the fire, but by the damaging effects of smoke inhalation which can lead to disorientation, loss of consciousness, or even death.

To combat the damaging effects of smoke inhalation, fire safety personnel often make a hole or series of holes in the roof of a structure using an axe, saw, or similar instrument upon arriving on the scene of a fire. This process is often referred to as venting. The hole(s) allow smoke to escape from the interior of the structure, thereby reducing the damaging effects of smoke inhalation. This may reduce the risk of serious injuries or death to any occupants who remain inside the structure, and may also allow the fire safety personnel to combat the fire with a reduced risk of smoke inhalation.

Many structures, in particular residential homes, come equipped with one or more skylights to allow natural light into the interior of the structure. These skylights come in a variety of shapes and sizes, and typically do not include a mechanism by which the skylight may be opened.

Many attempts have been made to utilize skylights as a means for effecting an opening (i.e. a hole) in the roof of a structure to allow smoke to escape in the case of a fire. One early attempt is described in U.S. Pat. No. 3,735,530 (hereinafter the "'530 Patent") which discloses, "[a] device for opening a skylight, particularly for opening same automatically in case of fire."

The '530 Patent relies upon a "fusible retaining device" which retains a leaf engagement to a casing of a skylight frame. The fusible retaining device is required to melt in order to allow a spring to act to generate a starting impulse which swings the leaf into an opened position. This fusible link requires a certain amount of heat to melt. In some instances, the amount of heat may be so great as to only occur after the fire reaches the skylight fixture, at which point dangerous levels of smoke may already have built up within the interior of the structure. In other instances, the amount of heat may be so little as to occur due to the buildup of heat within the interior of the structure at or near the skylight during the normal course of the day, causing the skylight to open unnecessarily when no smoke or fire is present.

United States Patent Publication No. 2007/0271848 A1 (hereinafter the "848 Publication") discloses another attempt to utilize a skylight as a means for effecting an opening (i.e. a hole) in the roof of a structure to allow smoke to escape in the case of a fire. The '848 Publication discloses "Lain operable fenestration operating system for a structure including a window or skylight having a frame, an operable sash and presenting a resistance force opposing opening and closing of the sash."

The '848 Publication relies upon a series of complex motorized operators, sensors, and processors connected through electrical circuitry in order to open and close the skylight or window. In practice, these components can melt or deform due to the heat of the fire, thereby rendering the opening mechanisms inoperable when they are most needed. In addition, the complex electrical circuitry may be damaged by the fire, which can also render the opening mechanism inoperable.

While skylights may be used for venting residential structures, the skylight is not the only device which may be used for venting. In practice, any opening in a roof of a structure may be used for venting. In addition, other structures such as commercial buildings, industrial buildings, and even vehicles such as boats, ships, and recreational vehicles may include a venting apparatus.

The need exists, therefore, for an improved venting apparatus which opens automatically upon the detection of smoke within the structure or vehicle.

SUMMARY

A venting apparatus for an opening in a roof is disclosed. The venting apparatus may comprise an adapter, a mount, at least one torsion spring, a hinge, a latch, an electrical latch actuator, and a device.

The adapter may comprise a frame adapter section, a lip, and a protrusion. The frame adapter section may have at least three frame adapter section members which define a frame adapter section perimeter having a frame adapter section inner surface and a frame adapter section outer surface. The lip may extend inwardly from a portion of the frame adapter section inner surface located at a top edge of each of the frame adapter section members. The protrusion may extend upwardly from the lip. The protrusion may have at least three protrusion members which define a protrusion perimeter having a protrusion inner surface and a protrusion outer surface.

The mount may comprise at least three mount members which define a mount perimeter having a mount inner surface and a mount outer surface.

The latch may have a latch opened position and a latch closed position. The electrical latch actuator may be electrically connected to a battery. The device may also be electrically connected to the battery.

The frame adapter section inner surface may be configured to fit around an outer surface of a structural frame attached to the roof. The mount inner surface may be configured to fit around the protrusion outer surface. The hinge may connect the adapter to the mount along a first mount member of the at least three mount members. The torsion spring may connect the adapter to the mount along a first mount member of the at least three mount members. The latch may connect the adapter to the mount along a second mount member of the at least three mount members. The electrical latch actuator may be mechanically connected to the latch. The electrical latch actuator may be configured to receive a signal from the device which may cause the electrical latch actuator to mechanically act on the latch to change the latch from the latch closed position to the latch opened position.

The device may be a sensor unit from a smoke detector. In some embodiments, the sensor unit may be an ionization sensor unit. In other embodiments, the sensor unit may be a photoelectric sensor unit. In certain embodiments, the device may be hard wired to an electrical grid as opposed to being connected to the battery.

In some embodiments, the latch may comprise a latch bar and a latch bracket. The latch bracket may have a pivotable latch lever comprising a recess. The latch bar may be connected to a first surface selected from the protrusion inner surface or the mount inner surface. The latch bracket may be connected to a second surface which is not the same as the first surface and is selected from the protrusion inner surface or the mount inner surface. The latch bar may be configured to interact with the recess of the latch bracket when the latch is in the latch closed position. In some embodiments, the pivotable latch lever may comprise a magnet.

In certain embodiments, each torsion spring may connect at least a portion of the protrusion outer surface along one of the protrusion members to at least a portion of the mount inner surface along one of the mount members.

The venting apparatus may further comprise at least one actuator. When present, the at least one actuator may comprise a first actuator connected at a first actuator first end to the mount inner surface along one of the mount members which is not the mount member to which the hinge is connected, and may be connected at a first actuator second end to the protrusion inner surface along one of the protrusion members which corresponds to the mount member to which the first actuator first end is connected. The at least one actuator, when present, may further comprise a second actuator connected at a second actuator first end to the mount inner surface along one of the mount members which is not the member to which the hinge is connected and is also not the member to which the first actuator first end is connected, and may be connected at a second actuator second end to the protrusion inner surface along one of the protrusion members which corresponds to the mount member to which the second actuator first end is connected. In some embodiments, when used, the at least one actuator may be a gas charged actuator.

In some embodiments, the venting apparatus may comprise three frame adapter section members, three protrusion members and three mount members. In other embodiments, the venting apparatus may comprise four frame adapter section members, four protrusion members and four mount members. In still other embodiments, the venting apparatus may comprise five frame adapter section members, five protrusion members and five mount members. In yet other embodiments, the venting apparatus may comprise six frame adapter section members, six protrusion members and six mount members. In still other embodiments, the venting apparatus may comprise eight frame adapter section members, eight protrusion members and eight mount members.

In some embodiments, the mount may further comprise a skylight glass located within the mount perimeter. In other embodiments, the venting apparatus may further comprise a skylight configured to engage with the mount perimeter.

In some embodiments, the venting apparatus may further comprise a test button electrically connected to the device. In some embodiments, the venting apparatus may further comprise a mechanical latch actuator mechanically connected to the latch. In some embodiments, the venting apparatus may further comprise a retrieval hook.

In certain embodiments, the battery may be a 9V battery. In some embodiments, the electrical latch actuator may be electrically connected to the battery through a relay. In some embodiments, the device may be electrically connected to the battery through a relay.

DETAILED DESCRIPTION

Disclosed herein is a venting apparatus for an opening in a roof. The venting apparatus is described below with reference to the FIGURES. As described herein and in the claims, the following numbers refer to the following structures as noted in the FIGURES.

10 refers to a venting apparatus.
20 refers to a skylight.
50 refers to a structural frame.
55 refers to an outer surface (of the structural frame).
100 refers to an adapter.
110 refers to a frame adapter section.
111 refers to a first frame adapter section member.
112 refers to a second frame adapter section member.
113 refers to a third frame adapter section member.
114 refers to a fourth frame adapter section member.
116 refers to a frame adapter section inner surface.
118 refers to a frame adapter section outer surface.
120 refers to a lip.
130 refers to a protrusion.
131 refers to a first protrusion member.
132 refers to a second protrusion member.
133 refers to a third protrusion member.
134 refers to a fourth protrusion member.
136 refers to a protrusion inner surface.
138 refers to a protrusion outer surface.
200 refers to a mount.
210 refers to a first mount member.
220 refers to a second mount member.
230 refers to a third mount member.
240 refers to a fourth mount member.
250 refers to a mount inner surface.
260 refers to a mount outer surface.
300 refers to a hinge.
310 refers to a first portion (of the hinge).

320 refers to a second portion (of the hinge).
400 refers to a latch.
410A refers to a latch opened position.
410B refers to a latch closed position.
420 refers to a latch bar.
430 refers to a latch bracket.
432 refers to a pivotable latch lever.
434 refers to a recess.
440 refers to a latch actuator.
450 refers to a latch actuator power supply.
500 refers to a device.
510 refers to a relay.
520 refers to a battery.
600 refers to an actuator.
600A refers to a first actuator.
600B refers to a second actuator.
610A refers to a first actuator first end.
610B refers to a second actuator first end.
620A refers to a first actuator second end.
620B refers to a second actuator second end.
700A refers to a first torsion spring.
700B refers to a second torsion spring.

Figure 1:
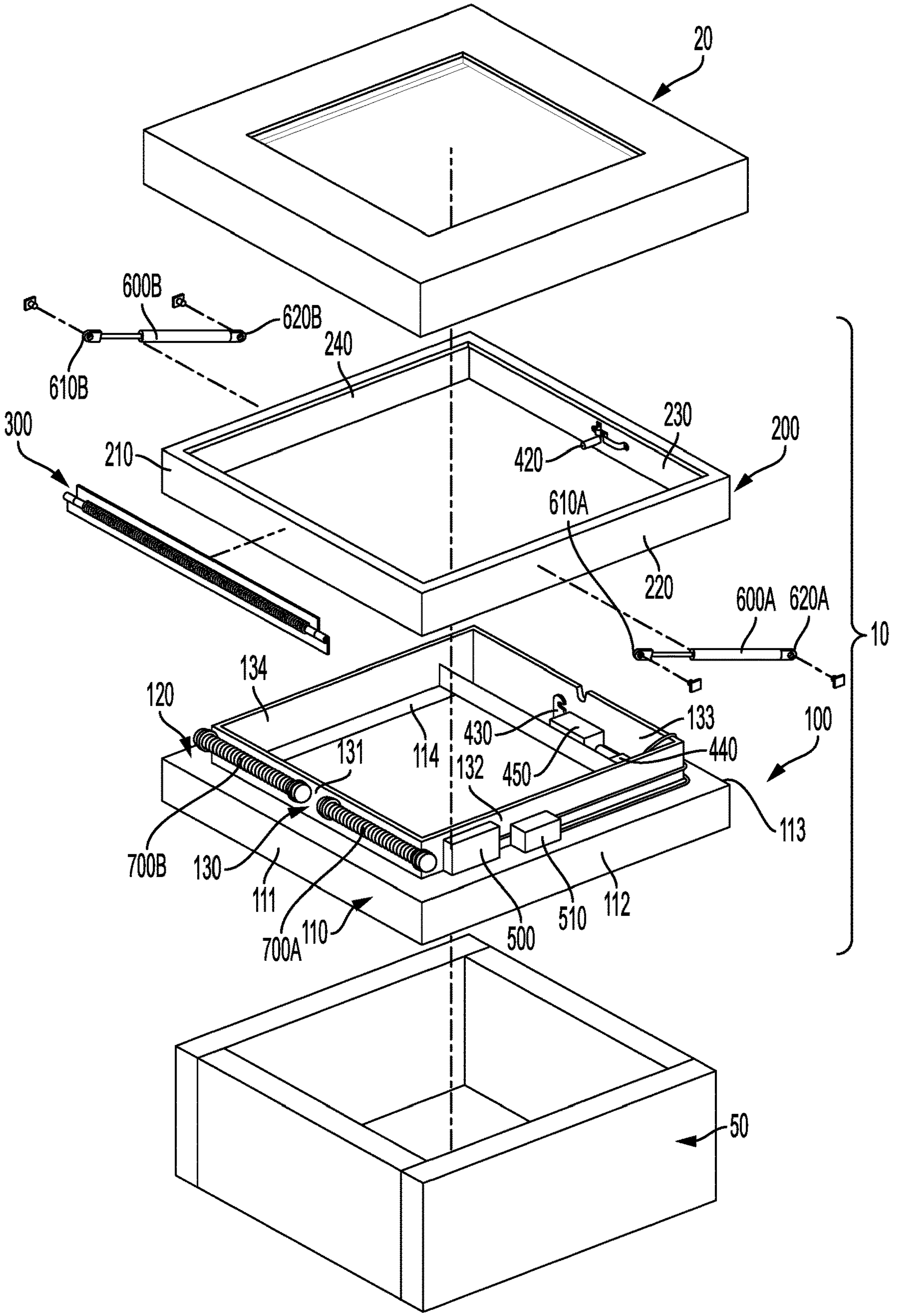
FIG. 1 is an exploded perspective view of one embodiment of a venting apparatus.

FIG. 1 depicts an exploded perspective view of a venting apparatus (10). As shown in FIG. 1, the venting apparatus may comprise a structural frame (50), an adapter (100), and a mount (200).

As shown in FIG. 1, the adapter (100) may include a frame adapter section (110), a lip (120), and a protrusion (130). The frame adapter section may be comprised of at least three frame adapter section members connected to one another to define a frame adapter section perimeter. The embodiment shown in FIG. 1 depicts the frame adapter section having four frame adapter section members, a first frame adapter section member (111), a second frame adapter section member (112), a third frame adapter section member (113), and a fourth frame adapter section member (114) forming a square or rectangular frame adapter section perimeter. However, one of ordinary skill will recognize that the number and configuration of frame adapter section members will depend, at least in part, on the desired shape of the venting apparatus. In some embodiments, there may be three frame adapter section members forming a triangular frame adapter section perimeter. In other embodiments, there may be five frame adapter section members forming a heptagonal frame adapter section perimeter. In yet other embodiments, there may be six frame adapter section members forming a hexagonal frame adapter section perimeter. In still other embodiments, there may be eight frame adapter section members forming an octagonal frame adapter section perimeter.

As shown in FIG. 1, the protrusion (130) may be comprised of at least three protrusion members connected to one another to define a protrusion perimeter. The embodiment shown in FIG. 1 depicts the protrusion having four protrusion members, a first protrusion member (131), a second protrusion member (132), a third protrusion member (133), and a fourth protrusion member (134) forming a square or rectangular protrusion perimeter. However, one of ordinary skill will recognize that the number and configuration of protrusion members will depend, at least in part, on the desired shape of the venting apparatus. In some embodiments, there may be three protrusion members forming a triangular protrusion perimeter. In other embodiments, there may be five protrusion members forming a heptagonal protrusion perimeter. In yet other embodiments, there may be six protrusion members forming a hexagonal protrusion perimeter. In still other embodiments, there may be eight protrusion members forming an octagonal protrusion perimeter. Preferably, the number of protrusion members will equal the number of frame adapter section members.

The adapter (100) may be fabricated from any number of materials including steel, aluminum, titanium, plastic, and wood. Each component of an adapter member—i.e. the first frame adapter section member (111), the lip (120), and the first protrusion member (130)—may be fabricated from separate pieces of material which are joined together by fasteners, adhesives, welds, or the like. Alternatively, each component of an adapter member may be fabricated from one unitary piece of material.

FIG. 1 also shows the mount (200) which may comprise at least three mount members connected to one another to define a mount perimeter. The embodiment shown in FIG. 1 depicts the mount having four mount members, a first mount member (210), a second mount member (220), a third mount member (230), and a fourth mount member (240) forming a square or rectangular mount perimeter. However, one of ordinary skill will recognize that the number and configuration of mount members will depend, at least in part, on the desired shape of the venting apparatus. In some embodiments, there may be three mount members forming a triangular mount perimeter. In other embodiments, there may be five mount members forming a heptagonal mount perimeter. In yet other embodiments, there may be six mount members forming a hexagonal mount perimeter. In still other embodiments, there may be eight mount members forming an octagonal mount perimeter. Preferably, the number of mount members will equal the number of frame adapter section members and the number of protrusion members.

The mount (200) may be fabricated from any number of materials including steel, aluminum, titanium, plastic, and wood. Each component of a mount member—i.e. the first mount member (210), the second mount member (220), the third mount member (230), and the fourth mount member (240)—may be fabricated from separate pieces of material which are joined together by fasteners, adhesives, welds, or the like. Alternatively, each component of the mount may be fabricated from one unitary piece of material.

FIG. 1 also shows the structural frame (50) which may comprise at least three structural frame members connected to one another to define a structural frame perimeter. The embodiment shown in FIG. 1 depicts the structural frame having four structural frame members. However, one of ordinary skill will recognize that the number and configuration of frame members will depend, at least in part, on the desired shape of the venting apparatus. In some embodiments there may be three structural frame members forming a triangular structural frame perimeter. In other embodiments, there may be five structural frame members forming a heptagonal structural frame perimeter. In yet other embodiments, there may be six structural frame members forming a hexagonal structural frame perimeter. In still other embodiments, there may be eight structural frame members forming an octagonal structural frame perimeter. Preferably, the number of structural frame members will equal the number of mount members, the number of frame adapter section members, and the number of protrusion members.

FIG. 1 also shows hardware for connecting the various components. As shown in FIG. 1, this hardware may include a hinge (300), which may connect the adapter (100) to the mount (200). In some embodiments, such as that shown in FIG. 1, the hinge may be a spring loaded hinge which provides for a rotational force which allows the skylight mount to pivot away from the adapter when the latch is opened as described herein. Also shown in FIG. 1 are two actuators (600A and 600B). Each actuator having an actuator first end (610A and 610B) which may be connected to a mount inner surface, and an actuator second end (620A and 620B) which may be connected to an adapter inner surface. These actuators, which are considered optional, may provide a portion or all of the force for pivoting the mount away from the adapter when the latch is opened as described herein. One of ordinary skill will recognize that the actuators are optional, and that both actuators are not required. Embodiments may exist where there is only a first actuator, only a second actuator, both a first actuator and a second actuator, or no actuator at all.

FIG. 1 also shows equipment for both detecting smoke and then opening the venting apparatus. The equipment may include a device (500) for detecting smoke, a relay (510), a latch actuator (440), and a latch actuator power supply (450). The equipment may also include a pair of torsion springs (a first torsion spring (700A) and a second torsion spring (700B)). While FIG. 1 shows the equipment attached to the adapter (100), various components of the equipment may be attached to other elements including the structural frame (50) and/or the mount (200).

Figure 9:
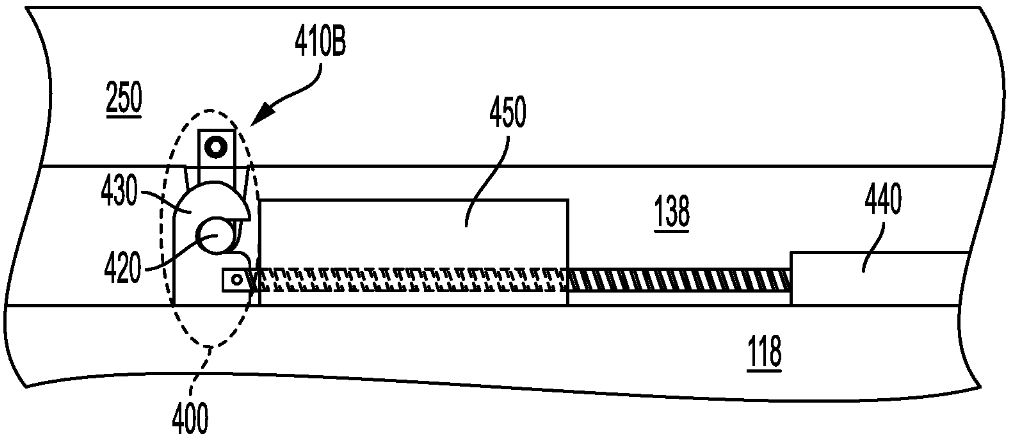
FIG. 9 is a front view of one embodiment of a latch for a venting apparatus in a latch closed position.
Figure 10:
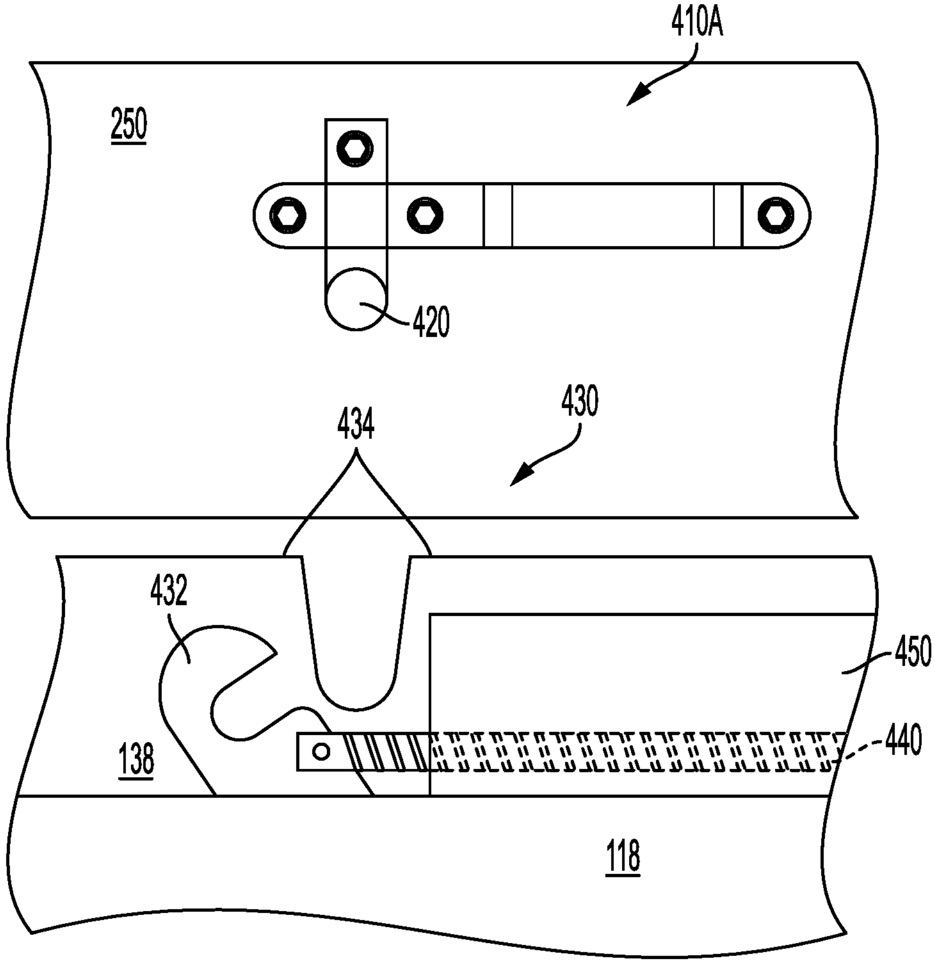
FIG. 10 is a front view of the embodiment of a latch for a venting apparatus of FIG. 9 in a latch opened position.

The device (500) may be configured to send a signal to the latch actuator power supply (450) which activates the latch actuator (440) to open the latch (300) by changing the latch from the latch closed position (410B as shown in FIG. 9) to the latch opened position (410A as shown in FIG. 10). One of ordinary skill will recognize that, in order to change from the latch closed position to the latch opened position, the latch actuator should be electrically connected to the latch actuator power supply which should be electrically connected to the device. In some embodiments, the signal sent from the device to the latch actuator power supply may pass through the relay (510).

The device (500) may be a sensor unit from a common household smoke detector which may be powered by a battery (520) (such as a 9-volt battery) or may be hard wired to an electrical grid. The sensor unit may be either an ionization sensor unit or a photoelectric sensor unit. When the device detects smoke within the interior of the building, it may send the signal from the device to the latch actuator power supply (450) causing the latch actuator (440) to mechanically act on the latch to change the latch from the latch closed position to the latch opened position. When the latch changes to the latch opened position, the skylight mount may be acted upon by the opening force provided by any individual or combination of the spring loaded hinge (300), the actuator(s) (600), and/or the torsion spring(s) (700) which may open the skylight allowing the smoke to exit the structure or vehicle during the early stages of the fire without the need for fire safety personnel to cut a hole in the roof of the structure or vehicle. In some embodiments, the device may include a test button electrically connected to the device which, when pressed by an operator, will emit a signal (such as a flash of light, or an audible noise) that indicates that the device is functioning.

The latch actuator power supply (450) may be a battery (520). One preferred battery is a common 9-volt battery. In alternative embodiments, the latch actuator power supply may be an electrical grid with the latch actuator (440) hard wired to the electrical grid.

The latch actuator (440) may be an electric actuator comprising a rod attached at one end to a piston located within a cylinder and at an opposite end to the pivotable latch lever (432) of the latch (400). When the latch actuator power supply receives the signal from the device (500), it activates the latch actuator to move the piston from one end of the cylinder towards the opposite end of the cylinder, thereby extending the rod out of the cylinder and pivoting the pivotable latch lever until it reaches the latch opened position (410A). One preferred latch actuator is an electric screw actuator which extends and retracts by threading a rod into and out of an electrically driven motor in order to pivot the pivotable latch lever between the latch opened position and the latch closed position.

FIG. 1 also shows an embodiment of the adapter (100) comprising at least one torsion spring (700). In some embodiments, the at least one torsion spring may comprise at least two torsion springs known as a first torsion spring (700A) and a second torsion spring (700B). Preferably, the torsion spring(s) will be located on a portion of the lip or the protrusion corresponding to a frame adapter section member which is the same frame adapter section member to which the hinge is connected. When present—the torsion springs, which are shown in more detail in FIG. 13 and FIG. 14, may be used to assist in opening the venting apparatus. When the latch is opened—such as by the device (500) detecting smoke and sending a signal to the latch actuator power supply (450) to advance the latch actuator (440) changing the latch (400) from the latch closed position (410B) to the latch opened position (410A)—the torsion spring(s) may apply an upward pressure to the mount which begins the process of pivoting the mount away from the adapter.

Figure 2:
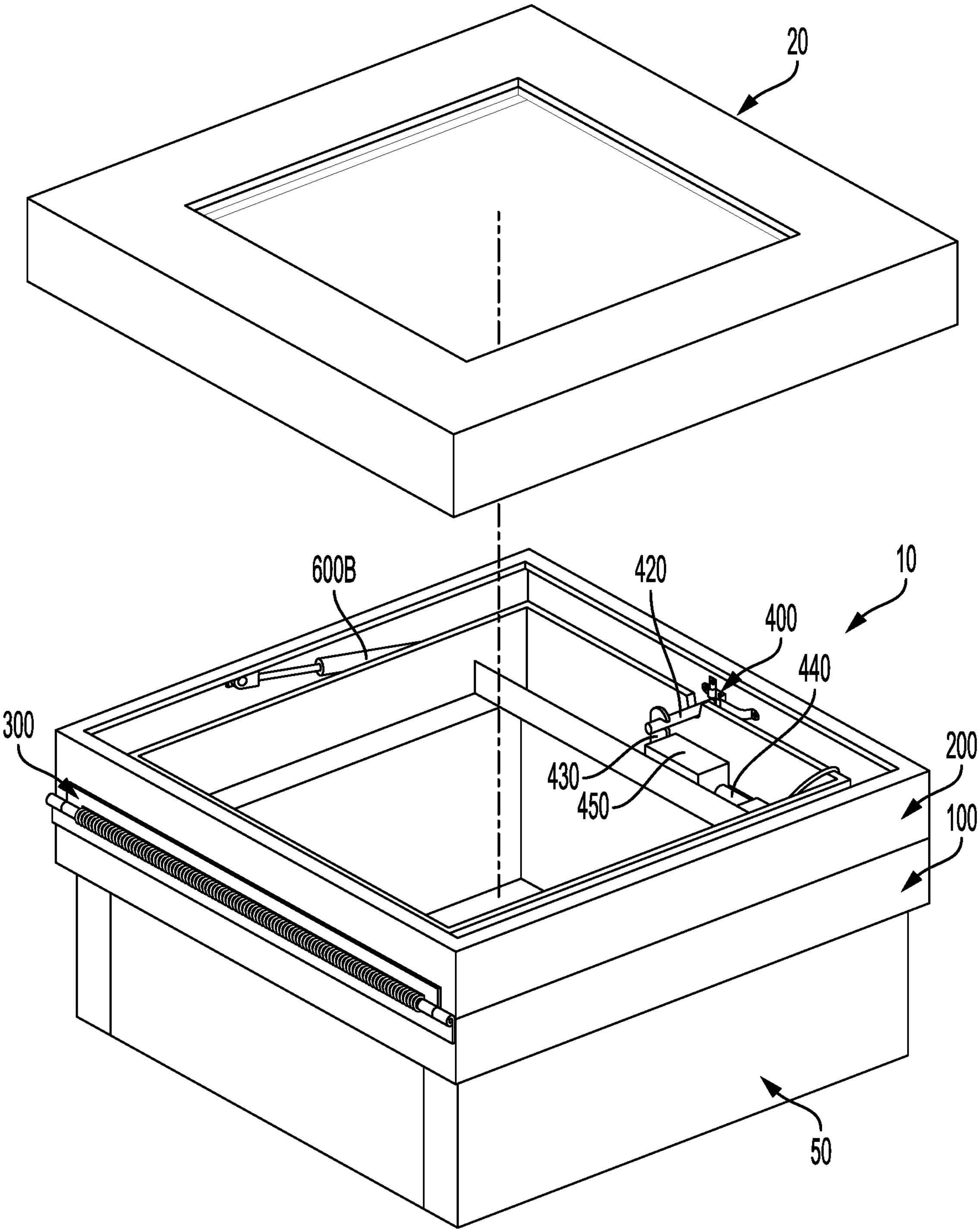
FIG. 2 is a partially exploded perspective view of the embodiment of a venting apparatus of FIG. 1.

FIG. 2 depicts the adapter (100) disposed onto the structural frame (50). As shown in FIG. 2, the adapter may be configured to fit around the structural frame. This may be accomplished by constructing the frame adapter section to have the same perimeter shape as the structural frame with each frame adapter section member having a greater length dimension than the length dimension of the corresponding structural frame member. For instance, if the structural frame is of a standard square perimeter with each structural frame member having a length of two (2) feet, then the frame adapter section should also be of a standard square perimeter with each frame adapter section member having a length greater than two (2) feet. Preferably, the frame adapter section members will have a length which is only slightly longer than that of the corresponding structural frame members. In this context, by slightly longer it is meant that the frame adapter section members have a length dimension selected from the group consisting of no longer than 4 inches greater than the corresponding structural frame member length dimension, no longer than 3 inches greater than the corresponding structural frame member length dimension, no longer than 2 inches greater than the corresponding structural frame member length dimension, no longer than 1 inch greater than the corresponding structural frame member length dimension, and no longer than 0.5 inches greater than the corresponding structural frame member length dimension.

In some embodiments, disposing the adapter (100) onto the structural frame (50) may include a fastener mechanism (not shown) for securing the adapter to the structural frame. The fastener mechanism may be selected from the group consisting of a plurality of screws, a plurality of bolts, a plurality of latches, and combinations thereof. In some embodiments, there may be an adhesive layer and/or a silicon layer disposed between the adapter and the structural frame to further assist with fastening the adapter to the structural frame, and/or to provide an air seal between the adapter and the structural frame.

FIG. 2 also depicts the mount (200) disposed onto the adapter (100). As shown in FIG. 2, the mount may be configured to fit around the protrusion of the adapter. This may be accomplished by constructing the mount to have the same perimeter shape as the protrusion with each mount member having a greater length dimension than the length dimension of the corresponding protrusion member. For instance, in a standard square perimeter with each protrusion member having a length of two (2) feet, the mount would be of a standard square perimeter with each mount member having a length of greater than two (2) feet. Preferably, the mount members will have a length which is only slightly longer than that of the corresponding protrusion members. In this context, by slightly longer it is meant that the mount members have a length dimension selected from the group consisting of no longer than 4 inches greater than the corresponding protrusion member length dimension, no longer than 3 inches greater than the corresponding protrusion member length dimension, no longer than 2 inches greater than the corresponding protrusion member length dimension, no longer than 1 inch greater than the corresponding protrusion member length dimension, and no longer than 0.5 inches greater than the corresponding protrusion member length dimension. In some embodiments there may be a layer of foam or weather-stripping between one or more of the protrusion members and one or more of the corresponding mount members to reduce air flow into and/or out of the structure. Preferably, there may be a layer of foam or weather-stripping between each of the protrusion members and their corresponding mount members.

Figure 3:
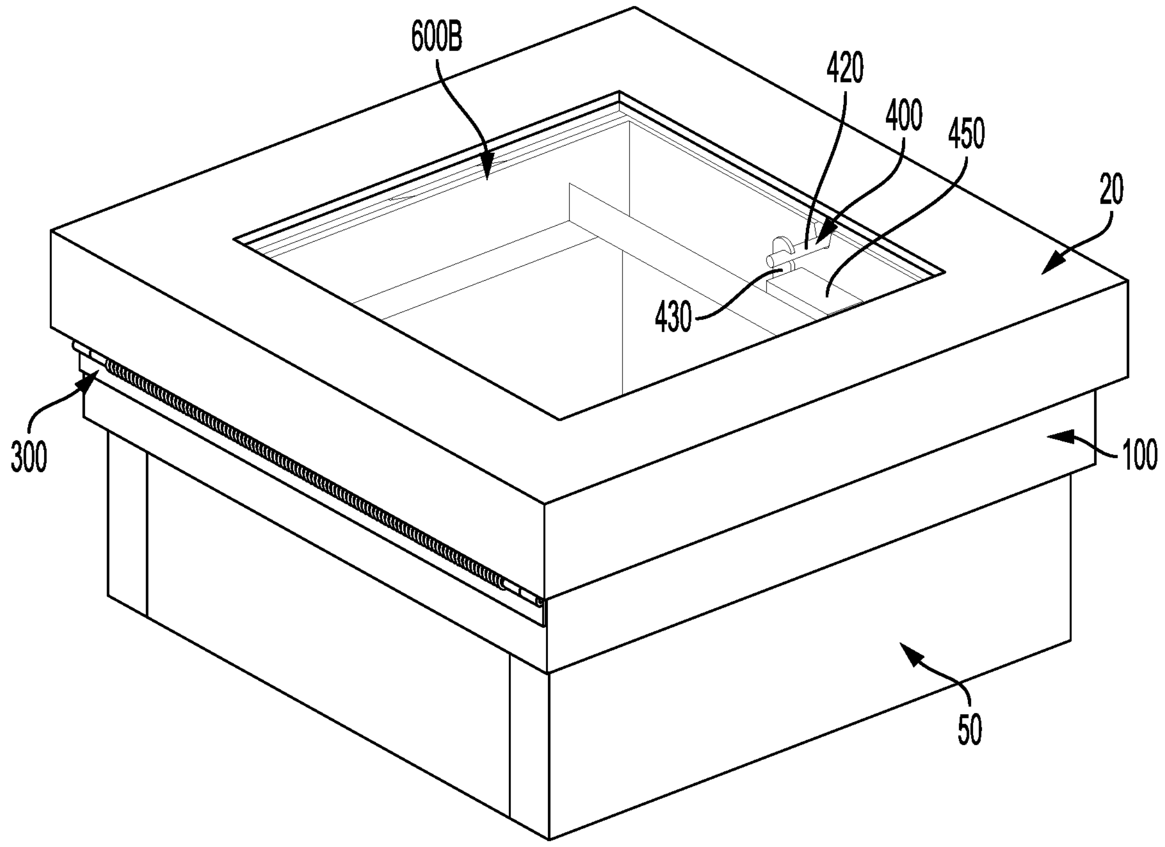
FIG. 3 is an assembled perspective view of the embodiment of a venting apparatus of FIG. 1.

FIG. 3 depicts one embodiment in which a skylight (20)—which is considered optional and is preferably only utilized in retrofit applications—is disposed on the mount (200). As shown in FIG. 3, when used, the skylight may be configured to fit around the mount. This may be accomplished by constructing the skylight to have the same perimeter shape as the mount with each skylight member having a greater length dimension that the length dimension of the corresponding mount member. For instance, if the skylight is of a standard square perimeter with each mount member having a length of two (2) feet, then the skylight should also be of a standard square perimeter with each skylight member having a length of greater than two (2) feet. Preferably, the skylight members will have a length which is only slightly longer than that of the corresponding mount members. In this context, by slightly longer it is meant that the skylight members have a length dimension selected from the group consisting of no longer than 4 inches greater than the corresponding mount member length dimension, no longer than 3 inches greater than the corresponding mount member length dimension, no longer than 2 inches greater than the corresponding mount member length dimension, no longer than 1 inch greater than the corresponding mount member length dimension, and no longer than 0.5 inches greater than the corresponding mount member length dimension.

In some embodiments, disposing the skylight (20) onto the mount (200) may include a fastener mechanism (not shown) for securing the skylight to the mount. The fastener mechanism may be selected from the group consisting of a plurality of screws, a plurality of bolts, a plurality of latches, and combinations thereof. In some embodiments, there may be an adhesive layer and/or a silicon layer disposed between the skylight and the mount to further assist with fastening the skylight to the mount, and to provide an air seal between the skylight and the mount.

Figure 4:
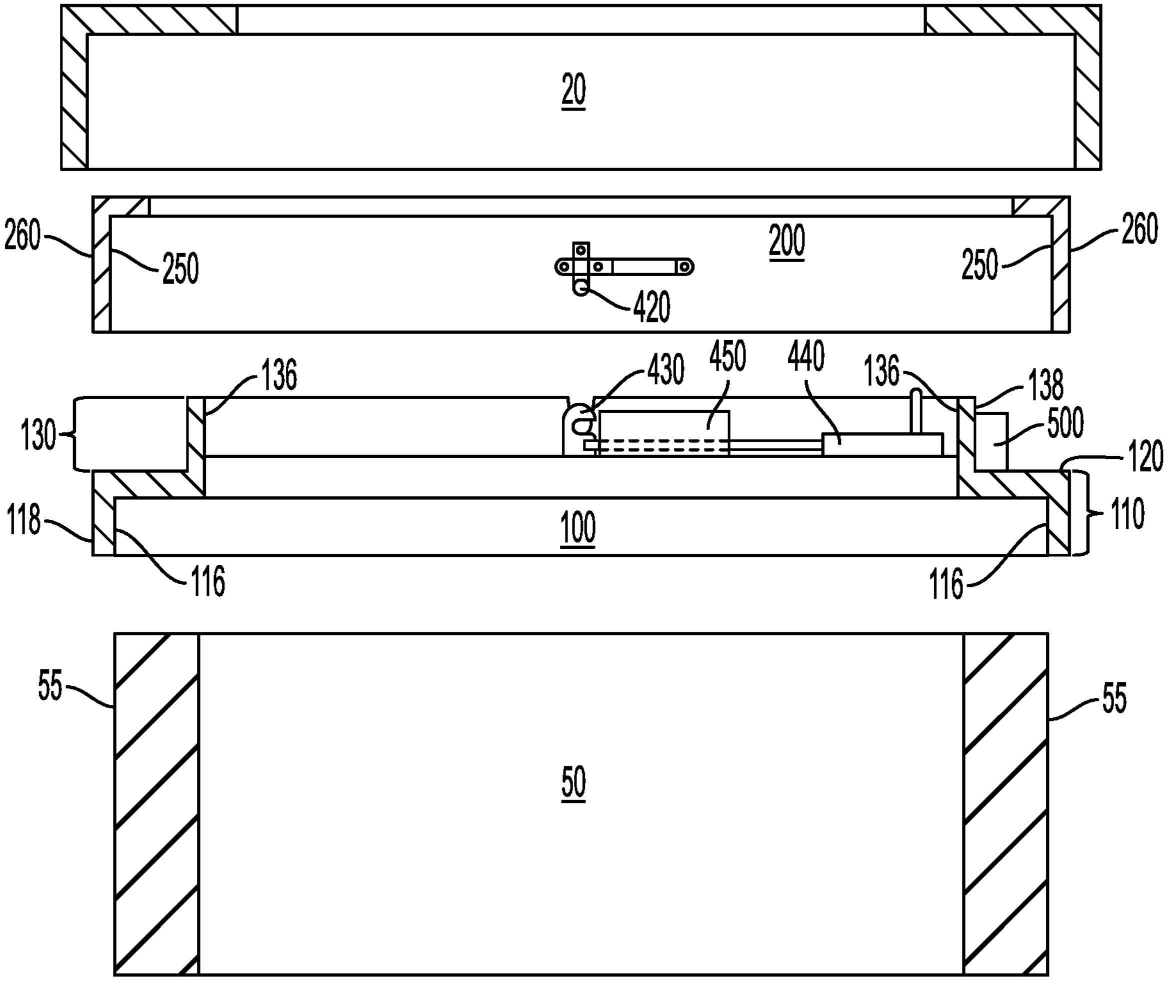
FIG. 4 is an exploded side cross-sectional view of one embodiment of a venting apparatus.

FIG. 4 depicts the venting apparatus (10) including the structural frame (50), the adapter (100), the mount (200), and the skylight (20). As shown in FIG. 4, the structural frame comprises a structural frame outer surface (55) defined by the structural frame members.

FIG. 4 also shows the adapter (100) which may comprise a frame adapter section (110), a lip (120), and a protrusion (130). As shown in FIG. 4, the frame adapter section may comprise the frame adapter section members which may define the frame adapter section perimeter having a frame adapter section inner surface (116) and a frame adapter section outer surface (118).

As shown in FIG. 4, the lip (120) may be attached to and extend inwardly from a portion of the frame adapter section inner surface (116) located along a top edge of each of the frame adapter section members. The protrusion (130) may then be attached to and extend upwardly from the lip. As shown in FIG. 4, the protrusion may comprise the protrusion members which may define the protrusion perimeter having a protrusion inner surface (136) and a protrusion outer surface (138).

FIG. 4 also shows the mount (200). As shown in FIG. 4, the mount may comprise the mount members which may define the mount perimeter having a mount inner surface (250) and a mount outer surface (260).

Figure 5:
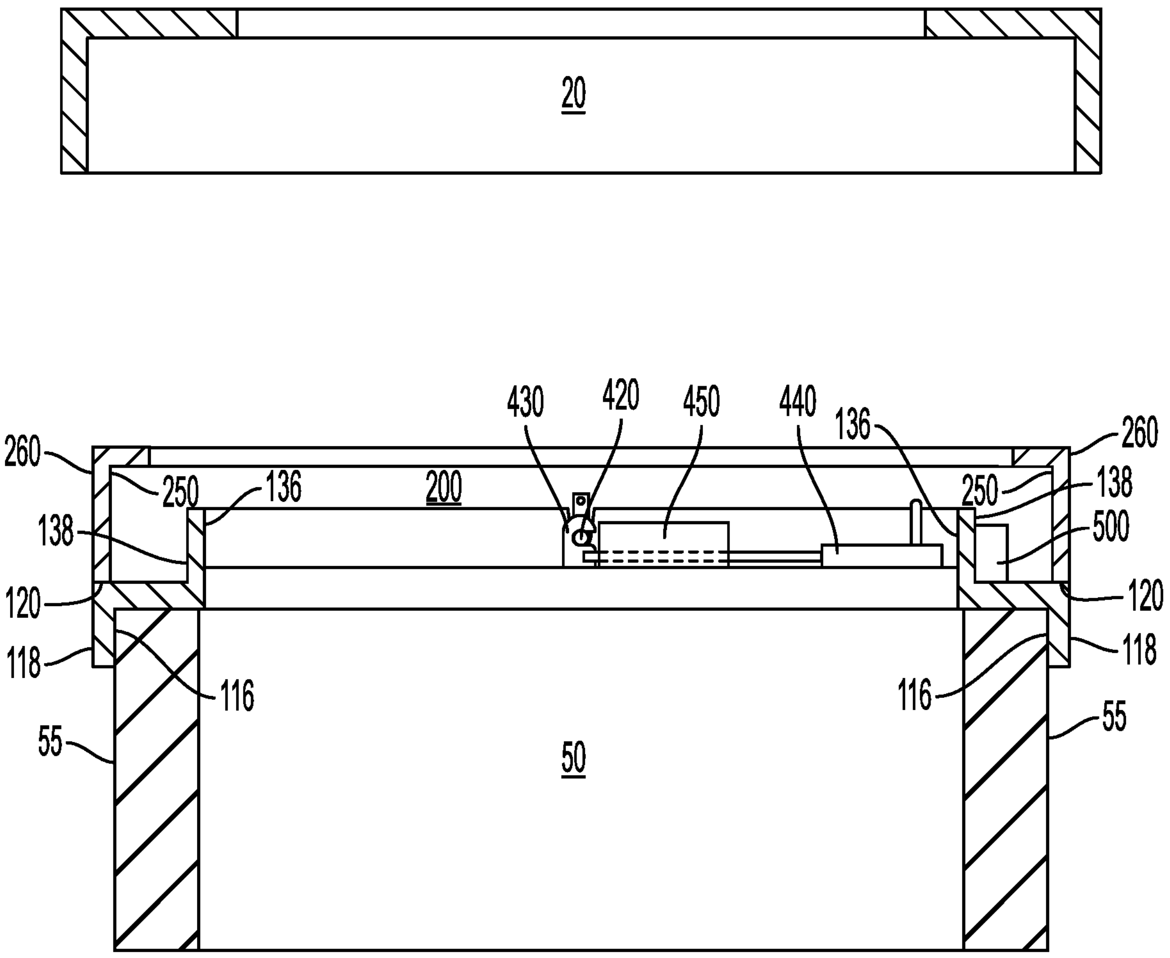
FIG. 5 is a partially exploded side cross-sectional view of the embodiment of a venting apparatus of FIG. 4.

FIG. 5 depicts the adapter (100) disposed onto the structural frame (50), and the mount (200) disposed onto the adapter. As shown in FIG. 5, the frame adapter section inner surface (116) may be configured to fit around the structural frame outer surface (55). Similarly, the mount inner surface (250) may be configured to fit around the protrusion outer surface (138).

Figure 6:
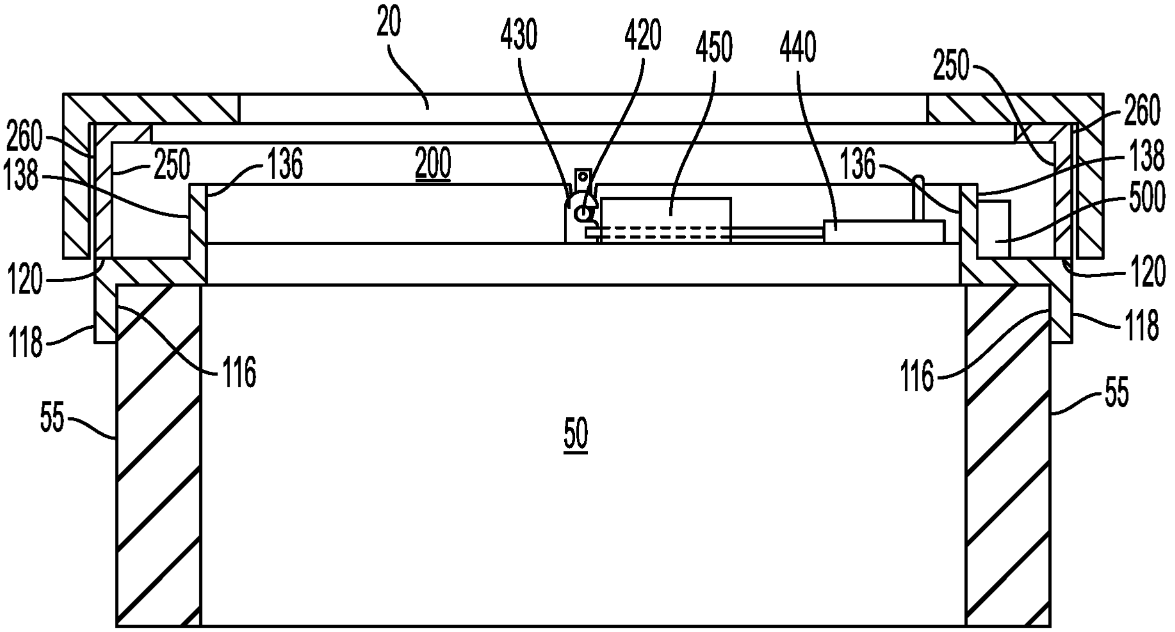
FIG. 6 is an assembled side cross-sectional view of the embodiment of a venting apparatus of FIG. 4.

FIG. 6 depicts the (optional) skylight (20) disposed onto the mount (200). As shown in FIG. 6, an inner surface of the skylight may be configured to fit around the mount outer surface (260).

Figure 7:
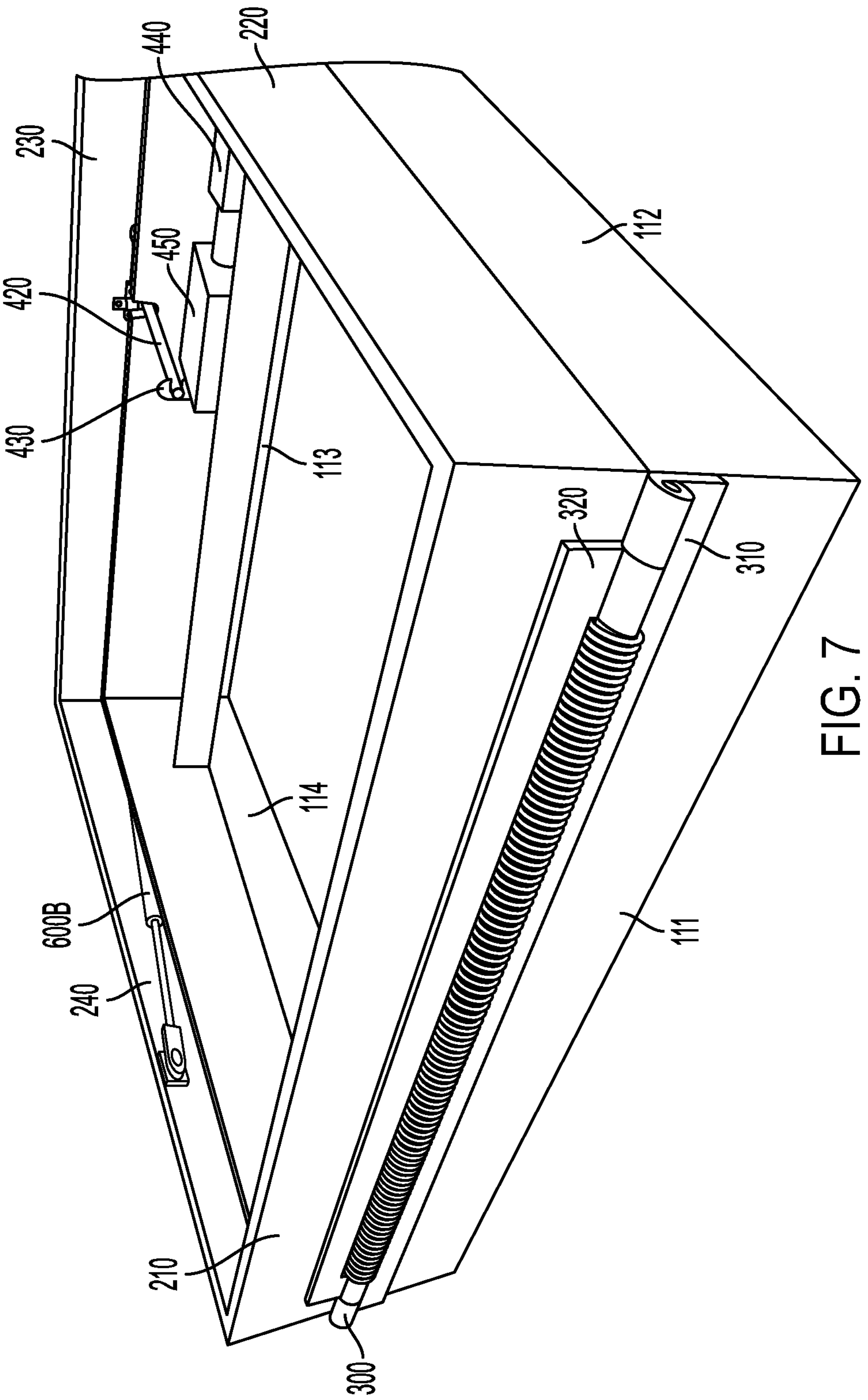
FIG. 7 is a perspective view of one embodiment of a structural frame, adapter, and mount of a venting apparatus.

FIG. 7 depicts a hinge (300) which may connect the adapter (100) to the mount (200). As shown in FIG. 7, a first portion (310) of the hinge may be connected to the frame adapter section on the frame adapter section outer surface along one of the frame adapter section members. While the embodiment shown in FIG. 7 shows the first portion of the hinge connected to the first frame adapter section member, one of ordinary skill will recognize that the first portion of the hinge may be connected to any of the frame adapter section members. A second portion (320) of the hinge may be connected to the mount on the mount outer surface along one of the mount members. While the embodiment shown in FIG. 7 shows the second portion of the hinge connected to the first mount member (210), one of ordinary skill will recognize that the second portion of the hinge may be connected to any of the mount members. The hinge is preferably connected to only one frame adapter section member, and one mount member. The hinge may be connected to either an inner surface of the frame adapter section member and an inner surface of the mount member, or an outer surface of the frame adapter section member and an outer surface of the mount member.

The type of hinge is not considered important and can be selected from any number of types of hinges known in the art and those yet to be invented. The hinge may be either a continuous hinge or a non-continuous hinge. A continuous hinge spans the entire length of one of the frame adapter section members and one of the mount members (as shown in FIG. 7) while a non-continuous hinge does not span the entire length of one of the frame adapter section members and one of the mount members. In this sense, a non-continuous hinge may be considered to be dispersed along the length of one of the frame adapter section members and one of the mount members. In some embodiments, there may be at least two, at least three, or at least four hinges of a non-continuous variety dispersed along the length of one of the frame adapter section members and one of the mount members. Examples of non-continuous hinges include, but are not limited to, bi-fold hinges, butt hinges, case hinges, flag hinges, gate hinges, off-set hinges, overlay hinges, and slip joint hinges.

Preferably, the type of hinge (continuous or non-continuous) will be of a spring loaded variety. The spring loaded hinge is preferred as it provides an opening force which may be applied to the skylight mount when the latch (400) is moved from the latch closed position (410B as shown in FIG. 9) to the latch opened position (410A as shown in FIG. 10).

Figure 8:
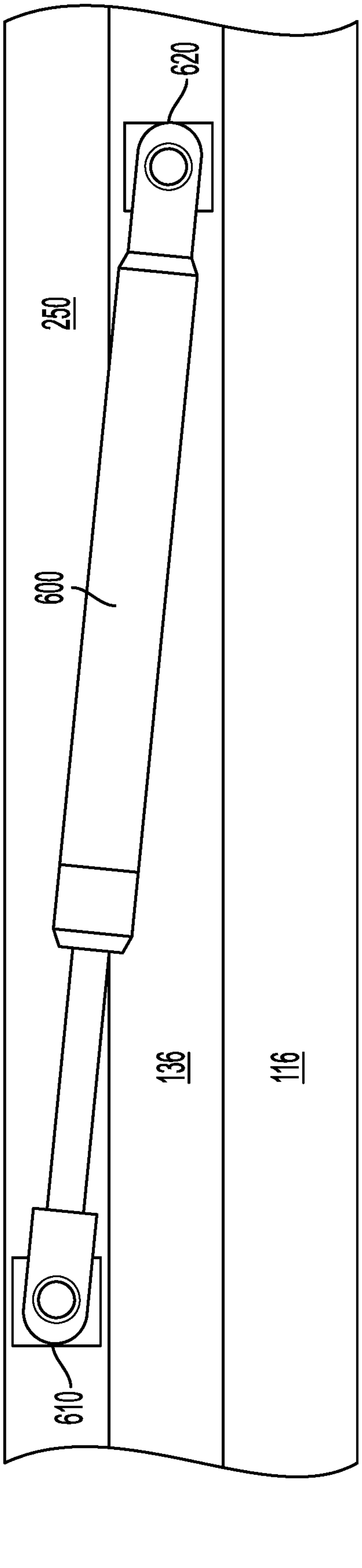
FIG. 8 is a front view of one embodiment of an actuator for a venting apparatus.

FIG. 8 depicts a further embodiment in which the venting apparatus comprises at least one actuator (600). The at least one actuator may comprise a single actuator (known as a first actuator (600A) as shown in FIG. 1), or dual actuators (known as a first actuator and a second actuator (600B) as shown in FIG. 1). When used, each actuator may have an actuator first end (610) and an actuator second end (620). The actuator first end may be connected to the mount inner surface along one of the mount members. Preferably, the mount member to which the actuator first end is connected is not the mount member to which the hinge is connected. Similarly, the actuator second end may be connected to the protrusion inner surface along one of the protrusion members which may correspond to the mount member to which the actuator first end is connected.

When used, the second actuator may have a second actuator first end and a second actuator second end. The second actuator first end may be connected to the mount inner surface along one of the mount members. Preferably, the mount member to which the second actuator first end is connected is not the mount member to which the hinge is connected, and is also not the member to which the first actuator first end is connected. Similarly, the second actuator second end may be connected to the protrusion inner surface along one of the protrusion members which may correspond to the mount member to which the second actuator first end is connected.

The actuator(s), when used, may be of any number of varieties. The preferred actuator is a gas charged actuator. One such gas charged actuator is a Strong Arm® Part No. 4418 available from AVM, Industries of Marion, South Carolina, U.S.A.

FIG. 9 and FIG. 10 depict a latch (400) which may allow the mount to be securely closed with FIG. 9 showing the latch in a latch closed position (410B) and FIG. 10 showing the latch in a latch opened position (410A). While FIG. 9 and FIG. 10 show one embodiment of a latch, any number of latches which exist in the prior art, and those yet to be invented, may be utilized.

The latch (400) shown in FIG. 9 and FIG. 10 may comprise a latch bar (420) and a latch bracket (430). The latch bracket may have a pivotable latch lever (432) comprising a recess (434). As shown in the FIGURES, the latch bar may be connected to a first surface which may be selected from the protrusion inner surface or the mount inner surface. The latch bracket may then be connected to a second surface which is not the same as the first surface and is selected from the protrusion inner surface or the mount inner surface. The first surface and second surface are preferably along corresponding members. In other words, if the first surface is the protrusion inner surface along one of the protrusion members, the second surface should be the mount inner surface along the mount member which corresponds to the protrusion member of the first surface when the mount is disposed onto the protrusion.

The latch bar (420) may be configured to interact with the recess (434) in the pivotable latch lever (432) such that, when the latch lever is pivoted to an opened position (as shown in FIG. 10), the latch bar disengages from the recess allowing the hinge (and/or the optional actuator(s) and/or the optional torsion spring(s)) to push open the mount. When the latch lever is pivoted to a closed position (as shown in FIG. 9), the latch bar engages the recess keeping the mount in the closed position. In some instances, the pivotable latch lever may comprise a magnet which assists in maintaining the pivotable latch lever in the closed position unless and until acted on by an outside force which may overcome the force of the magnet.

In some embodiments, the pivotable latch lever (432) may include a release tab extending therefrom which allows an individual to manually change the latch from the latch closed position to the latch closed position without activating the latch actuator. Some embodiments may also include a hook attached to one of the mount or the optional skylight which allows an individual to manually pull the mount back to a closed position using their finger, a pole or a similar device.

Figure 11:
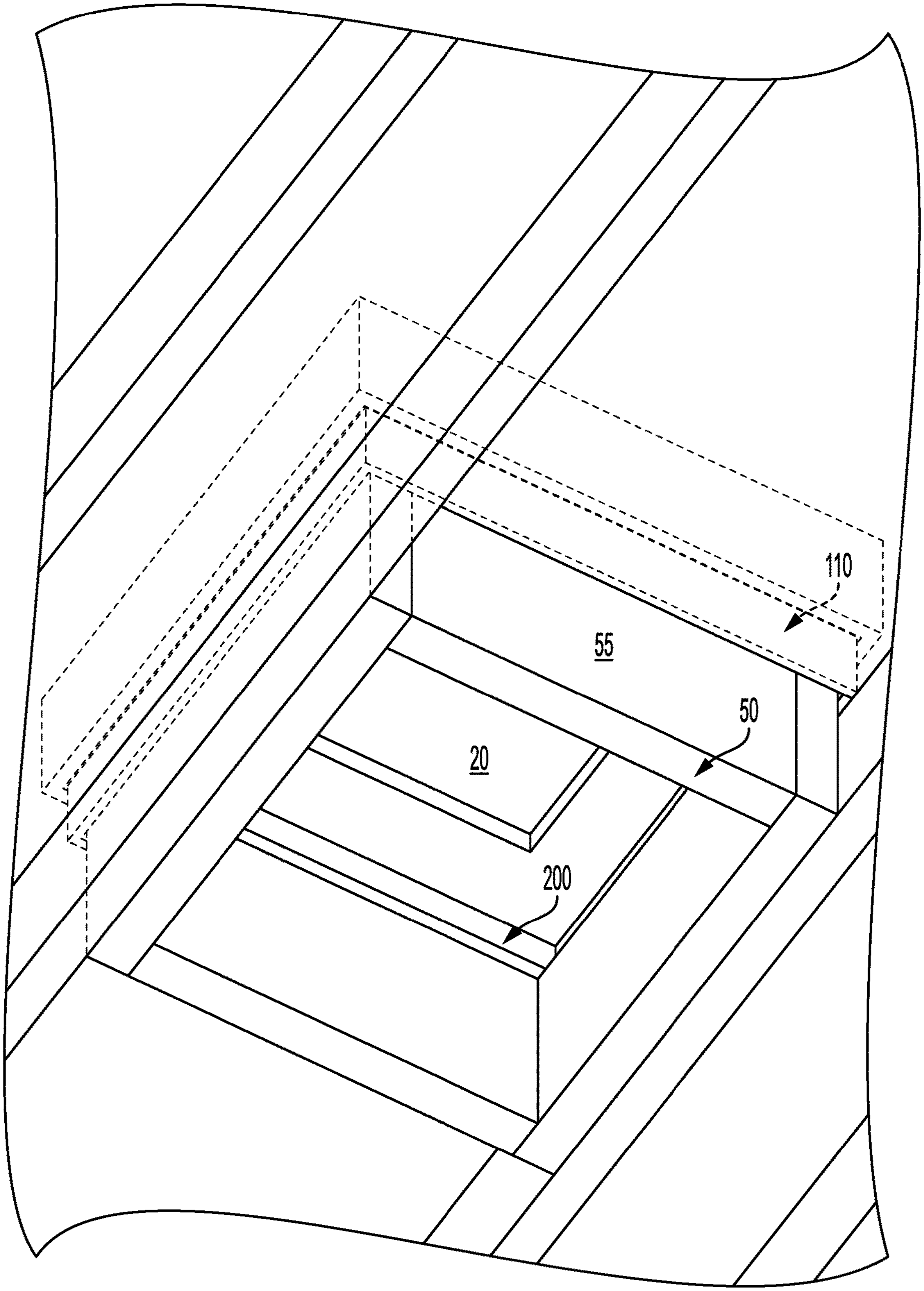
FIG. 11 is a bottom perspective view of an embodiment of a venting apparatus installed in a roof.
Figure 12:
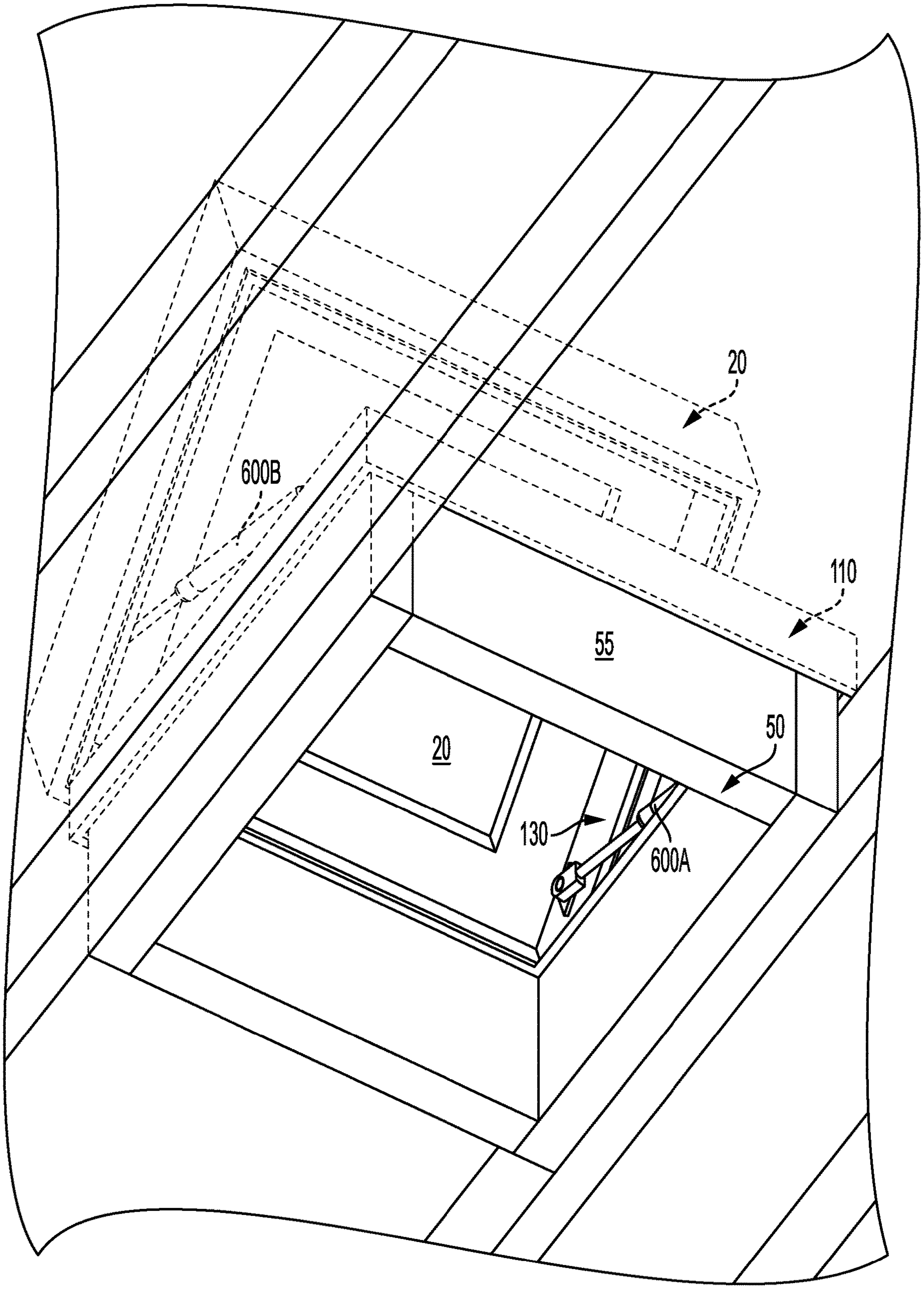
FIG. 12 is a bottom perspective view of an embodiment of a venting apparatus installed in a roof.

FIG. 11 depicts the assembled venting apparatus installed in the roof of a building and viewed from inside the building with the latch in a latch closed position such that the venting apparatus remains closed. FIG. 12 depicts the assembled venting apparatus installed in the roof of a building and viewed from inside the building with the latch in a latch opened position such that the venting apparatus is open.

Figure 13:
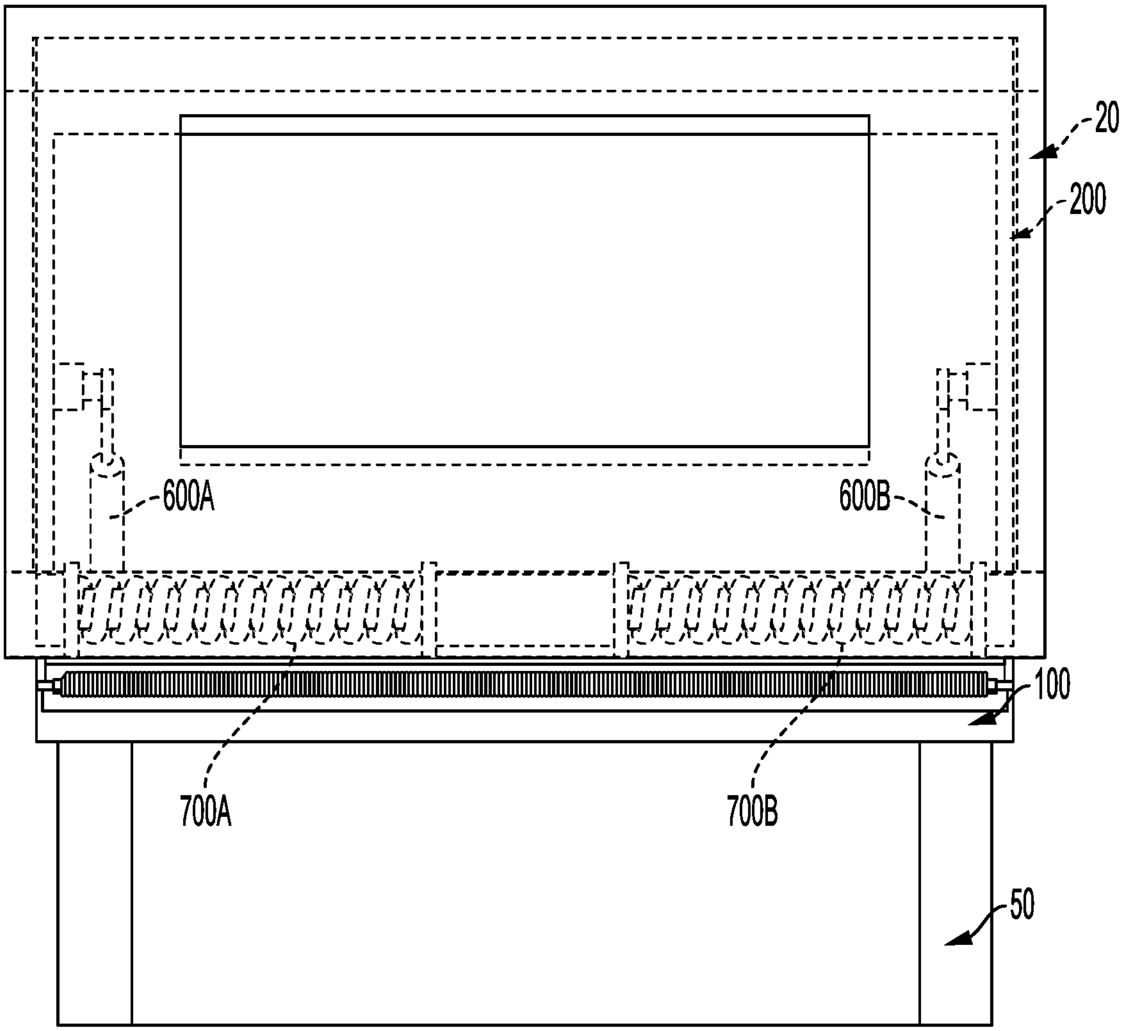
FIG. 13 is a front view of an embodiment of an adapter in an opened position showing torsion springs.

FIG. 13 depicts a front view of the venting apparatus in an "opened" position. FIG. 13 also shows the optional torsion springs (700A being the first torsion spring and 700B being the second torsion spring). The torsion springs are connected at one end to a portion of the protrusion outer surface along one of the protrusion members and at an opposite end to a portion of the mount inner surface along one of the mount members. As an alternative, the torsion spring(s) may be connected at one end to a portion of the lip instead of to a portion of the protrusion outer surface. When the latch is moved to the latch opened position, the torsion spring(s) may apply an upward pressure via rotational force of the torsion springs to the mount which begins the process of pivoting the mount away from the adapter.

Figure 14:
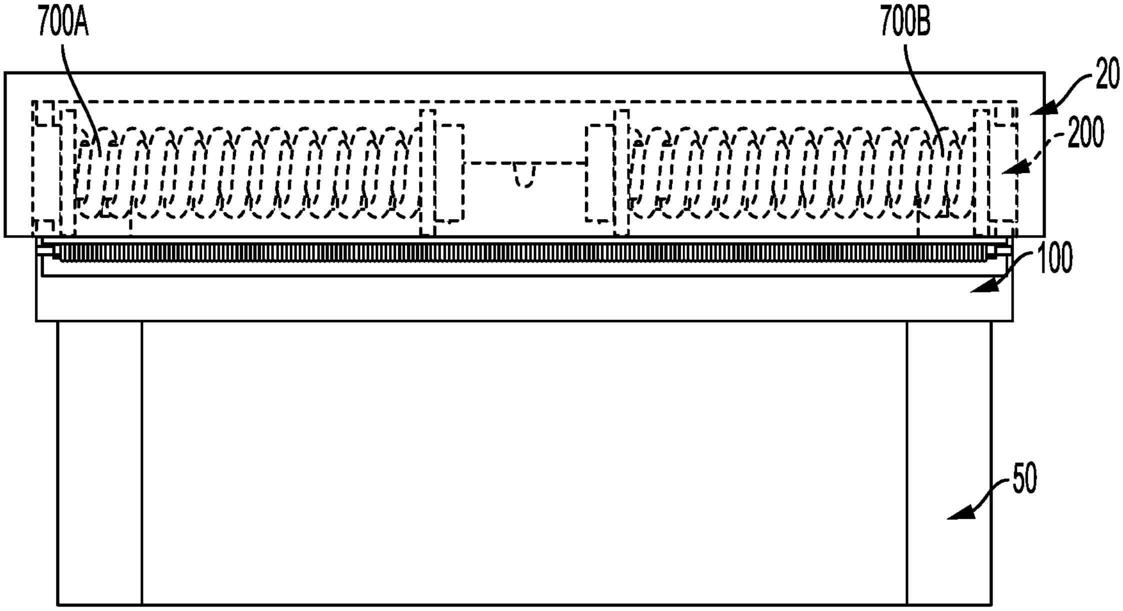
FIG. 14 is a front view of an embodiment of an adapter in a closed position showing torsion springs.

FIG. 14 depicts a front view of the venting apparatus in a "closed" position. FIG. 14 also shows the optional torsion springs (700A being the first torsion spring and 700B being the second torsion spring) in their retracted or down position prior to having applied upward pressure via rotational force to the mount.

Figure 15:
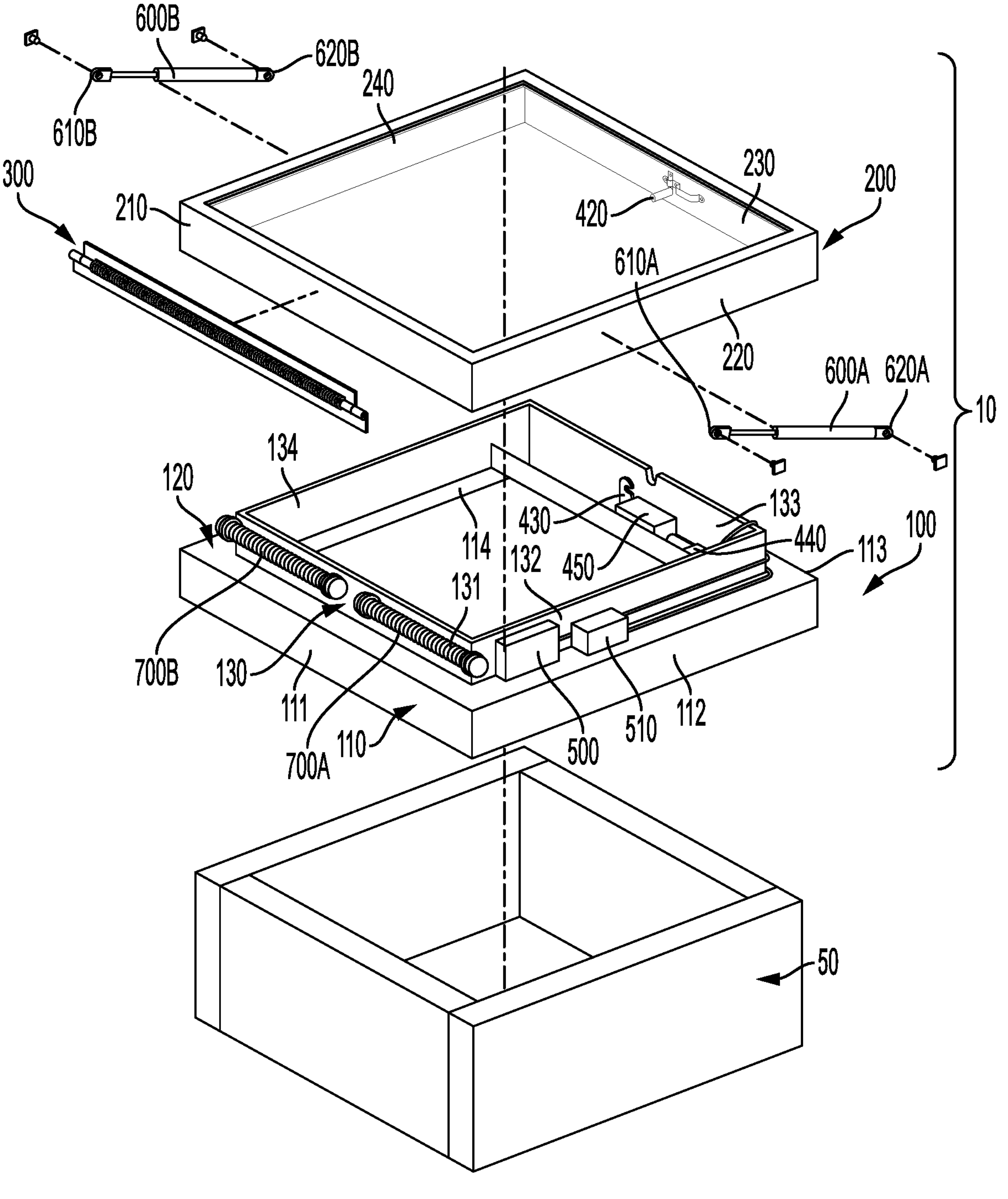
FIG. 15 is an exploded perspective view of an alternative embodiment of a venting apparatus.
Figure 16:
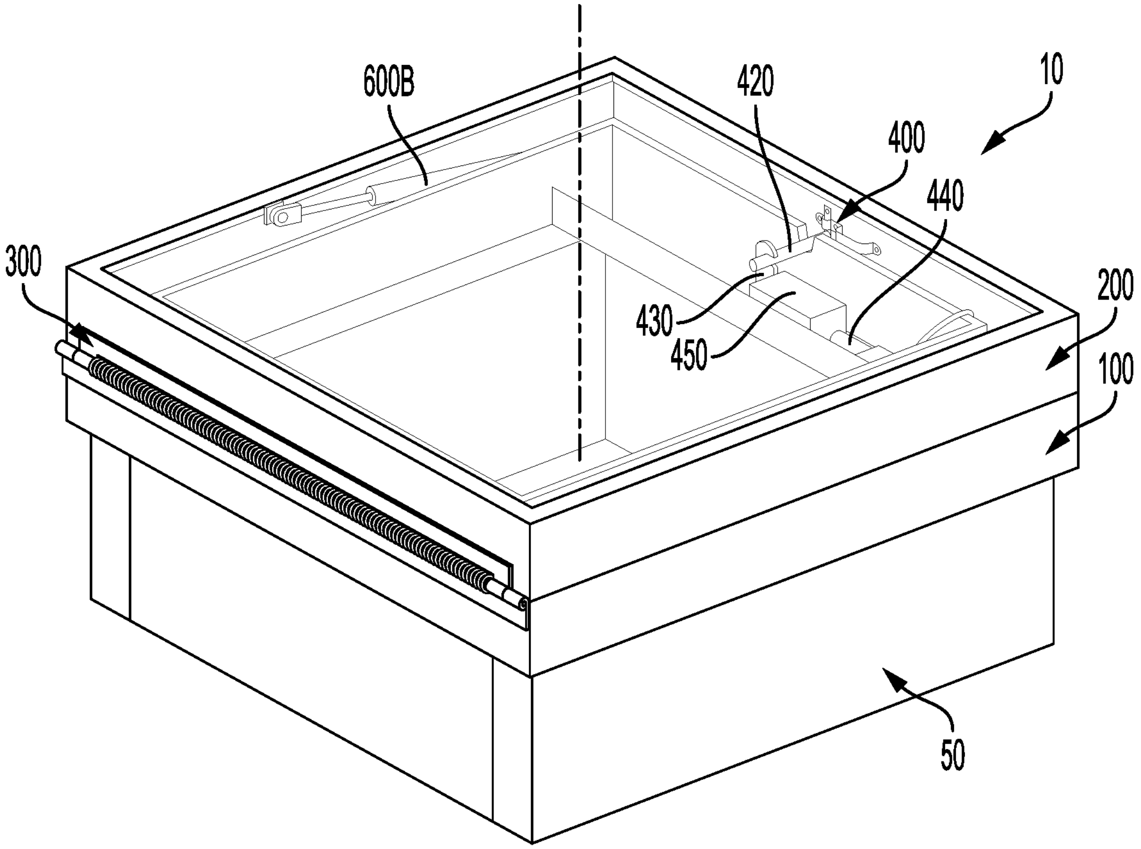
FIG. 16 is an assembled perspective view of the alternative embodiment of a venting apparatus of FIG. 15.

In certain embodiments, in particular those for new installations of skylights, hatches, or the like, it may be unnecessary to include a skylight element. In such embodiments, the adapter itself may be fitted with a glass element such that the adapter functions as a skylight, or may be covered on its top surface to serve as a hatch. Embodiments without a separate skylight element are shown in FIG. 15 and FIG. 16 with FIG. 15 being an exploded perspective view of such an embodiment and FIG. 16 being an assembled perspective view of such an embodiment. One will recognize that, the only difference between the embodiments shown in FIG. 15 and FIG. 16 compared to the embodiments shown in FIG. 1 to FIG. 14 is the absence of the separate skylight element. Instead, glass or another rigid structure may be disposed within the perimeter of the mount (200)

The venting apparatus disclosed herein provides a fully operational means in which to vent smoke from a structure or vehicle during a fire. Once the device detects smoke within the structure or vehicle, the device may automatically signal the latch to open, which allows the mount to pivot away from the adapter, thereby opening the venting apparatus and allowing smoke to vent from the structure or vehicle. Additionally, the self-contained nature of the device allows it to come in a kit form which can be retrofitted to an existing opening in a structure—such as a skylight—by removing the skylight from the structural frame, placing the adapter and mount assembly over the structural frame, and then installing the existing skylight to the mount member. The kit may include the adapter and the mount connected by the hinge, the latch, the latch actuator power supply, and the latch actuator. The kit may also include one or more of the device, the first actuator, the second actuator, the first torsion spring, and/or the second torsion spring. In some embodiments, the kit may also include a separate skylight (20).

One of ordinary skill will recognize that the venting apparatus may be disposed in a variety of locations within a structure or vehicle. While a single venting apparatus may be sufficient in many circumstances, in some structures or vehicles, there may be the need or desire for more than one venting apparatus. When using multiple venting apparatus, each venting apparatus may be disposed in a different location within the structure or vehicle, and each venting apparatus may be individually configured to send a signal to its respective latch to change from the latch closed position to the latch opened position. For instance, there may be at least two venting apparatus, at least three venting apparatus, at least four venting apparatus, at least five venting apparatus, or at least six venting apparatus. By increasing the number of venting apparatus and disposing each device in a different location or room, smoke in one location or room in the structure or vehicle may be detected sooner, thereby allowing the venting apparatus in that location or room to open and vent the structure or vehicle before the amount of smoke reaches dangerous levels. In one embodiment, there may be a device disposed in each room of a structure or vehicle. Examples of structures or vehicles which may utilize the venting apparatus include a home, an office building, an industrial building, a warehouse, a recreational vehicle, a boat, or a ship.

What is claimed is:

1. A venting apparatus (10) for an opening in a roof comprising:

an adapter (100) comprising:

a frame adapter section (110) having at least three frame adapter section members which define a frame adapter section perimeter having a frame adapter section inner surface (116) and a frame adapter section outer surface (118), a lip (120) extending inwardly from a portion of the frame adapter section inner surface located at a top edge of each of the frame adapter section members, and a protrusion (130) extending upwardly from the lip said protrusion having at least three protrusion members which define a protrusion perimeter having a protrusion inner surface (136) and a protrusion outer surface (138);

a mount (200) comprising at least three mount members which define a mount perimeter having a mount inner surface (250) and a mount outer surface (260);

at least one torsion spring (700);

a hinge (300);

a latch (400) having a latch opened position (410A) and a latch closed position (410B);

an electrical latch actuator (440) electrically connected to a battery (520); and a device (500) electrically connected to the battery, wherein the frame adapter section inner surface is configured to fit around an outer surface (55) of a structural frame (50) attached to the roof, the mount inner surface is configured to fit around the protrusion outer surface, the hinge connects the adapter to the mount along an outer surface of a first mount member of the at least three mount members, the torsion spring connects the adapter to the mount along an inner surface of the first mount member of the at least three mount members and is configured to provide an upward pressure to pivot the mount about the hinge away from the adapter when the latch is changed from a latch closed position to a latch open position, the latch connects the adapter to the mount along a second mount member of the at least three mount members, the electrical latch actuator is mechanically connected to the latch.

2. The venting apparatus of claim 1, wherein the device is hard wired to an electrical grid.

3. The venting apparatus of claim 1, wherein the latch comprises:

a latch bar (420); and a latch bracket (430) having a pivotable latch lever (432) comprising a recess (434), wherein the latch bar is connected to a first surface selected from the protrusion inner surface or the mount inner surface, the latch bracket is connected to a second surface which is not the same as the first surface and is selected from the protrusion inner surface or the mount inner surface, and the latch bar is configured to interact with the recess of the latch bracket when the latch is in the latch closed position.

4. The venting apparatus of claim 3, wherein the pivotable latch lever comprises a magnet.

5. The venting apparatus of claim 1, wherein each torsion spring connects at least a portion of the protrusion outer surface along one of the protrusion members to at least a portion of the mount inner surface along one of the mount members.

6. The venting apparatus of claim 1, further comprising at least one actuator (600).

7. The venting apparatus of claim 6, wherein the at least one actuator comprises a first actuator (600A) connected at a first actuator first end (610A) to the mount inner surface along one of the mount members which is not the mount member to which the hinge is connected, and connected at a first actuator second end (620A) to the protrusion inner surface along one of the protrusion members which corresponds to the mount member to which the first actuator first end is connected.

8. The venting apparatus of claim 7, wherein the at least one actuator further comprises a second actuator (600B) connected at a second actuator first end (610B) to the mount inner surface along one of the mount members which is not the member to which the hinge is connected and is also not the member to which the first actuator first end is connected, and connected at a second actuator second end (620B) to the protrusion inner surface along one of the protrusion members which corresponds to the mount member to which the second actuator first end is connected.

9. The venting apparatus of claim 6, wherein the at least one actuator is a gas charged actuator.

10. The venting apparatus of claim 1, comprising four frame adapter section members, four protrusion members, and four mount members.

11. The venting apparatus of claim 1, wherein the mount further comprises a skylight glass located within the mount perimeter.

12. The venting apparatus of claim 1, further comprising a skylight (20) configured to engage with the mount perimeter.

13. The venting apparatus of claim 1, further comprising a test button electrically connected to the device.

14. The venting apparatus of claim 1, further comprising a mechanical latch actuator mechanically connected to the latch.

15. The venting apparatus of claim 1, further comprising a retrieval hook.

16. The venting apparatus of claim 1, wherein the electrical latch actuator is electrically connected to the battery through a relay.

17. The venting apparatus of claim 1, wherein the device is electrically connected to the battery through a relay.

18. The venting apparatus of claim 1, wherein the device is a sensor unit from a smoke detector, and the electrical latch actuator is configured to receive a signal from the device upon detecting smoke which causes the electrical latch actuator to mechanically act on the latch to change the latch from the latch closed position to the latch opened position allowing the venting apparatus to open.

19. The venting apparatus of claim 18, wherein the sensor unit is an ionization sensor unit.

20. The venting apparatus of claim 18, wherein the sensor unit is a photoelectric sensor unit.

* * * * *